2,789,989

PREPARATION OF 21-HALO STEROIDS

Percy L. Julian, Chicago, and William J. Karpel, Oak Park, Ill., assignors to The Glidden Company, Cleveland, Ohio, a corporation of Ohio No Drawing. Application May 13, 1953,
Serial No. 354,868

7 Claims. (Cl. 260—397.47)

The present invention relates to the preparation of 21-halo steroids, and particularly relates to the preparation of 17α-hydroxy-20-keto-21-halo steroids of the $C_{21}$ series, and is a continuation-in-part of application Serial No. 143,146, filed February 8, 1950, and application Serial No. 184,124, filed September 9, 1950.

Application Serial No. 143,146 is directed to the treatment of 16-bromo-17α-hydroxy-20-keto-21-halo steroids of the $C_{21}$ series with a salt of an alkali metal hydroxide and a lower carboxylic acid whereby the 21-halo group is replaced by the acyloxy group of the salt. Application Serial No. 184,124 is directed, inter alia, to the treatment of saturated 11,20-diketo-17α-hydroxy-21-halo pregnanes with a salt of an alkali metal hydroxide and a lower carboxylic acid whereby the 21-halo group is replaced by the acyloxy group of the salt. Both of these prior applications point out the desirability of producing such 21-acyloxy compounds.

It is the purpose of the present invention to prepare 17α-hydroxy-20-keto-21-halo steroids of the $C_{21}$ series, the preparation of which are both broadly described, and in many cases specifically described, in the afore-mentioned applications.

It has been found that when saturated 17α-hydroxy-17β-acetyl steroids are treated with bromine, one of the hydrogen atoms of the methyl radical of the acetyl group is very readily replaced with bromine and that this replacement is a preferential replacement. When starting with unsaturated steroids, saturation of isolated double bonds prior to bromination at the 21-position is preferred for clean reactions.

The starting materials for the present invention can be conveniently prepared from 16,17-oxido compounds such as pregnenes, pregnanes, allopregnenes and allopregnanes by treatment with HBr to form 16-bromo-17α-hydroxy compounds. These can be either directly treated with bromine, preferably after saturation of unsaturated compounds, or the 16-bromo group can first be removed, as by treament with Raney nickel, and the resulting 17α-hydroxy compound then brominated at $C_{21}$. Alternatively, the 16,17-oxido group can be reduced by lithium aluminum hydride with intermediate protection of the 20-keto group by formation of a cyclic ethylene ketal.

The following examples are illustrative:

EXAMPLE 1

*Preparation of 5,6,16,21-tetrabromo-pregnane-3β,17α-diol-20-one-3 monoacetate*

A solution of one gram of 16,17α-oxido-pregnenolone acetate in 10 ml. of acetic acid was treated with a solution of 0.430 g. of bromine in 4.30 ml. of acetic acid at room temperature. After the bromine color had all disappeared, 1.5 ml. of 30% HBr in acetic acid and 10 ml. of carbon tetrachloride was added and the mixture was allowed to stand at room temperature for one-half hour. An additional 0.430 g. of bromine in 4.30 ml. of acetic acid was then added. After standing for 1½ hours at room temperature, the bromine color had disappeared. The carbon tetrachloride was removed in vacuo and the remaining acetic acid solution was poured into water. The crystalline precipitate was filtered, washed well with water and air dried. 1.79 g., M. P. 145°–147° dec.

EXAMPLE 2

*Preparation of 16-bromo-21-iodo-5-pregnene-3β,17α-diol-20-one-3 monoacetate*

The tetrabromide from Example 1 was dissolved in 25 ml. of benzene and a solution of 4.0 g. of sodium iodide in 25 ml. of ethanol was added. This mixture was allowed to stand at room temperature for 20 hours, and then poured into a large volume of ether and water. The ether layer was washed with dilute sodium thiosulfate and water, dried and concentrated in vacuo to a tan solid residue.

EXAMPLE 3

*The bromination of 16,17-oxido-5-pregnene-3β-ol-20-one in acetic acid*

A solution of one gram of 16,17α-oxido-pregnenolone in 10 ml. of acetic acid was treated with 0.485 g. of bromine in 4.85 ml. of acetic acid at room temperature. After the bromine color had all disappeared, 1.5 ml. of 30% HBr in acetic acid and 15 ml. of carbon tetrachloride were added. A precipitate appears which goes back into solution on standing. After one-half hour at room temperature an additional 0.485 g. of bromine in 4.85 cc. of acetic acid was added. After standing for one hour at room temperature an additional 0.485 g. of bromine in 4.85 cc. of acetic acid was added. After standing for one hour at room temperature, the bromine color had disappeared. The carbon tetrachloride was removed in vacuo and the acetic acid solution was poured into water. The crystalline precipitate was filtered, washed well with water and air dried. 2.14 g., M. P. 145–147° dec. There was no depression in melting point on admixture with the product from Example 1; therefore, acetylation at position 3 has taken place in acetic acid in the presence of HBr.

EXAMPLE 4

*Treatment of 16,17-oxido-pregnane-3-ol-20-one acetate*

To a solution of 1 gram of 16,17-oxido-pregnane-3-ol-20-one acetate in 10 ml. of acetic acid is added 1.5 ml. of 30% HBr in acetic acid and 15 ml. of carbon tetrachloride. After one-half hour at room temperature there is added 0.430 g. of bromine in 4.30 ml. of acetic acid. The mixture is allowed to stand at room temperature until the bromine color disappears. The carbon tetrachloride is then removed in vacuo and the acetic acid solution poured into water, the precipitate filtered, washed well with water and dried.

EXAMPLE 5

*16,17-oxido-5-pregnene-3β,21-diol-20-one 21-monoacetate*

A solution of 10.0 g. of 16,17-oxido-5-pregnene-3β-ol-20-one acetate in 100 ml. of acetic acid and 100 ml. of carbon tetrachloride, chilled to 18°, was treated with a solution of 4.3 g. of bromine in 30 ml. of carbon tetrachloride. Upon complete decolorization, there was added 15 ml. of a 32% solution of hydrobromic acid in acetic acid. After the solution had stood for ten minutes at room temperature, a second molar equivalent of bromine, 4.3 g. in 30 ml. of carbon tetrachloride, was added portionwise at room temperature with stirring during a forty-minute period. The reaction mixture was allowed to stand for an additional fifteen minutes and then evaporated in vacuo with a minimum of heating to remove the carbon tetrachloride. The remaining suspension was poured into water, filtered and the separated solid washed with water and dried at 40°. The solid, 17.9 g., was dissolved in 75 ml. of benzene and 175 ml. of methanol, and after the addition of 5.2 g. of hydrogen bromide in 15 ml. of methanol, the solution was allowed to stand at room temperature for ten hours. The ethereal extract of the reaction mixture which had been diluted with water was washed with water, dried, concentrated to 20 ml. and diluted with 155 ml. of benzene. After the addition of a solution of 366.5 g. of sodium iodide in 175 ml. of absolute ethanol, the mixture was allowed to stand at room temperature for twenty-two hours. It was then diluted well with water and extracted with ether. The ether extract was washed with 3% sodium thiosulfate solution and then with water. The cream-colored residue (14.5 g.) remaining after removal of ether in vacuo was dissolved in 300 ml. of acetone containing 42 ml. of acetone containing 42 g. of freshly-fused potassium acetate. The mixture was refluxed for four and one-half hours, then concentrated to a small volume, diluted with water and extracted with ether. The water-washed and dried ethereal solution gave upon concentration to a small volume, 5.5 g. of 16,17-oxido-5-pregnene-3β,21-diol-20-one 21-monoacetate melting at 180–188°. A reslurry of the monoacetate in ether yielded 5.0 g. of material melting at 188–190°. Further recrystallization from acetone gave needles melting at 190–192°. $(\alpha)_D^{24}$ +14.9° (8.7 mg. made up to 2 ml. with chloroform, $\alpha_D$ +0.065°, $l$, 1 dm.).

*Analysis.*—Calc. for $C_{23}H_{32}O_5$: C=71.11; H=8.30. Found: C=70.86; H=8.33.

EXAMPLE 6

*Preparation of 21-bromo-pregnane-3,17α-diol-11,20-dione and its 3 monoacetate*

To a 4 g. solution of 15-oxiodopregnan-3α-ol-11,20-dione acetate in 40 cc. of acetic acid and 40 cc. of $CHCl_3$ cooled to 20° there was added 4 cc. of 32% HBr in acetic acid. After allowing to stand for ten minutes, a solution of 1.76 g. of bromine in 18 cc. of acetic acid was added rapidly and the mixture then held at room temperature for 20 minutes until the bromine had been absorbed. The reaction mixture was concentrated in vacuo to a crystalline slush, then slurried with alcohol free ether, chilled and filtered. There was obtained 3.38 g., M. P. 224–230° dec. of the 21-bromo-bromhydrin.

This was treated at room temperature with a mixture of 27 cc. of benzene and 72 cc. of methanol containing 1.9 g. of anhydrous HBr for 12 hours. The reaction mixture was diluted with water and extracted with ether and washed with water to neutrality. The solution was dried and concentrated in vacuo to a crystalline residue.

EXAMPLE 7

*Preparation of pregnane-3α,17α-diol-11,20-dione 3-monoacetate*

A solution of 60 g. of 16,17-oxido-pregnan-3α-ol-11,20-dione acetate in 300 cc. of glacial acetic acid was cooled to 15° and treated with a solution of 60 cc. of 32% hydrobromic acid in acetic acid. The reaction mixture was held at 20° for 15 minutes, whereupon the crystalline bromhydrin which separated was filtered and washed with ether. After drying the bromhydrin in vacuo with minimum heating during several minutes, it was stirred and refluxed for 3½ hours with 240 g. of standard Raney nickel in 2100 cc. of ethanol. The mixture was filtered through a bed of filter-aid, concentrated to low volume and crystallized from aqueous ethanol. There was obtained 45.8 g. of pregnane-3α,17α-diol-11,20-dione 3-monoacetate, M. P. 202°. Additional material can be obtained from the mother liquor.

EXAMPLE 8

*Preparation of 21-bromo-pregnane-3α,17α-diol-3,20-dione and its 3-acetate*

A solution of 72 g. of pregnane-3α,17α-diol-11,20-dione 3-monoacetate in 720 cc. of acetic acid at 30° was treated with 7.2 cc. of 32% HBr in acetic acid and a solution of 31 g. of bromine in 320 cc. of acetic acid during a 5-minute period. After cooling and filtering, there was obtained 62.5 g. of the 21-bromo derivative, M. P. 235°. Recrystallization raised the melting point to 245°.

*Analysis.*—Calc. for $C_{23}H_{32}O_5Br$: C=58.97; H=6.89. Found: C=58.85; H=7.17.

The filtrate was dehalogenated with zinc dust, diluted with water and extracted with ether. The ethereal solution, upon concentration, yielding a recovery of 15.5 g. of starting material, M. P. 201–202°. The 62.5 g. of 21-bromo derivative was hydrolyzed by stirring with a mixture of 500 cc. of benzene and 1500 cc. of methanol containing 39 g. of anhydrous HBr for 8 hours. The hydrolysis mixture was diluted with ether and washed with water to neutrality and then concentrated in vacuo to a totally crystalline residue.

EXAMPLE 9

*Preparation of 21-bromo-pregnane-3α,17α-diol-11,20 dione*

A solution of 5.0 g. of pregnane-3α,17α-diol-11,20-dione 3-monoacetate in 200 cc. of methanol was refluxed for 1½ hours with a solution of 5 g. of potassium bicarbonate in 15 cc. of water. 75 cc. of water was added and concentrated in vacuo to a crystalline slush and cooled. Filtration afforded 4.2 g. of the free diol, M. P. 201°. A solution 1.74 g. of the 3α,17α-diol in 17 cc. of chloroform was treated at room temperature with a few drops of dry HBr in chloroform and followed dropwise with a solution of 0.84 g. of bromine in 5 cc. of chloroform during 10 minutes. The solution was concentrated in vacuo to residue. The dried 21-bromo derivative was dissolved in 35 cc. of dry acetone and refluxed for 4½ hours with 5 g. of anhydrous potassium acetate. Concentrated and diluted with water and filtered. The dried crude product, upon crystallization from ethyl acetate, afforded 1.0 g. of pregnane-3α,17α,21-triol - 11,20 - dione 21 - monoacetate, M. P. 216°.

EXAMPLE 10

*Preparation of 21-bromopregnane-3α,17α-diol-12,20-dione 3 acetate*

To a solution of 3.9 g. of pregnane-3α,17α-diol-12,20-dione 3-acetate (M. P. 167° to 169° C.) in 40 cc. of glacial acetic acid, 2 drops of a 30% solution of hydrogen bromide in glacial acetic acid were added. Thereafter, at about 25° C., 1.8 g. of bromine in 4 cc. of glacial acetic acid were added dropwise during about 45 minutes, and the resulting mixture, after being stirred for about 15 minutes, was diluted with 150 cc. of cold water. The resulting emulsion was extracted with a mixture of ether and methylene chloride, and the extract was washed with water, aqueous sodium bicarbonate and finally with water to neutrality. The washed extract was dried over anhydrous sodium sulfate and then concentrated to obtain 2.6 g. of a product melting at 169° to 177° C. From the mother liquor an additional 0.24 g. of material melting at 156° to 166° C. was obtained. A portion of this material was treated with sodium iodide and sodium bisulfite in acetone solution as described in copending application of Julian and Karpel, Serial No. 116,415, filed September 17, 1949. In this manner a dehalogenated product melting at 147–155° C., which did not depress the melting point of pregnane-3α,17α-diol-12,20-dione 3-acetate, was obtained. This indicates that the bromine atom was substituted in the 21-position and hence the brominated product was 21-bromopregnane-3α,17α-diol-12,20-dione 3-acetate.

It will be appreciated that the foregoing examples are illustrative and that many variations can be employed without departing from the spirit of the invention. Thus, other esters than the 3-acetoxy ester can be employed, such as the benzoate, propionate, butyrate, hemisuccinate, etc. Either a free 3-OH or a 3-acetoxy group is to be preferred, however, when it is ultimately desired to have a 3-keto group, and this 3-keto group is to be formed after the introduction of the 21-bromo group.

Since a keto group is conveniently formed by oxidation of a secondary —OH group, an easily hydrolyzable acyloxy group is desirable in such case. 3-keto compounds can also be treated in accordance with the present invention.

It is seen that the particular substituents on the 10,13-dimethyl-cyclopentanopolyhydrophenanthrene are not important to the present invention other than the 17α-hydroxy-17α-acetyl groups. Thus, oxygenated substituents on Ring C can be present either as carbonyl, acyloxy, hydroxy, enol esters, etc. on either the 11- or 12-carbon atoms.

Also where unsaturated compounds, such as Δ-5 compounds, are used, the double bond can be saturated by other means than bromine. Thus, 5,6-dichloro compounds can be used. Thus, bromination of 5α,6β-dichloro-16-bromo-allopregnane-3,17α-diol-20-one 3-acetate yields 5α,6β-dichloro-16,21-dibromo-allopregnane-3,17α-diol-20-one 3-acetate, M. P. 189–193° C.

Attention is directed to our copending application Serial No. 354,424, filed May 11, 1953, wherein the conversion of the 21-bromides herein described to 21-acyloxy compounds is more fully described and claimed.

Having described the invention, what is claimed is:

1. The process which comprises treating a compound of the general formula

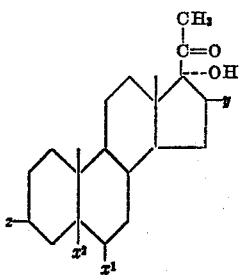

in which $x^1$ and $x^2$ are selected from the group consisting of hydrogen, bromine and chlorine substituents, and $y$ is selected from the class consisting of hydrogen and bromine substituents, and $z$ is selected from the class consisting of the hydroxy group and an OR group in which R is an acyl radical of a lower hydrocarbon carboxylic acid, with bromine whereby there is formed the corresponding 21-bromo derivative.

2. The process of claim 1 in which $x^1$, $x^2$ and $y$ are bromine and $z$ is an acyloxy group of a lower hydrocarbon carboxylic acid.

3. The process of claim 2 in which the acyloxy group is the acetoxy group.

4. The process of claim 1 in which $x^1$ and $x^2$ are chlorine, $y$ is bromine and $z$ is an acetoxy group.

5. The process of claim 1 in which $x^1$ and $x^2$ are hydrogen, $y$ is bromine and $z$ is an acetoxy group.

6. The process which comprises treating a saturated 3 - acyloxy-10,13-dimethyl-17α-hydroxy-17β-acetyl-cyclopentanopolyhydrophenanthrene steroid in which the acyloxy group is an acyloxy group of a lower hydrocarbon carboxylic acid, with bromine, whereby a 21-bromo-17α-hydroxy steroid is formed.

7. The process which comprises treating a saturated 10,13 - dimethyl - 3,17α - dihydroxy - 17β - acetyl - cyclopentanopolyhydrophenanthrene steroid with bromine, whereby a 21-bromo-17α-hydroxy steroid is formed.

References Cited in the file of this patent
UNITED STATES PATENTS

| | | |
|---|---|---|
| 2,359,773 | Marker | Oct. 10, 1944 |
| 2,409,043 | Inhoffen | Oct. 8, 1946 |
| 2,541,104 | Sarett | Feb. 13, 1951 |
| 2,596,562 | Kaufmann | May 13, 1952 |
| 2,596,563 | Kaufmann | May 13, 1952 |

OTHER REFERENCES

Gallagher: Jour. Am. Chem. Soc., 71, 3262–3263 (1949).